PHOTO-AND ELECTRO-SENSITIVE RECORDING APPARATUS AND METHOD
Filed Nov. 6, 1964
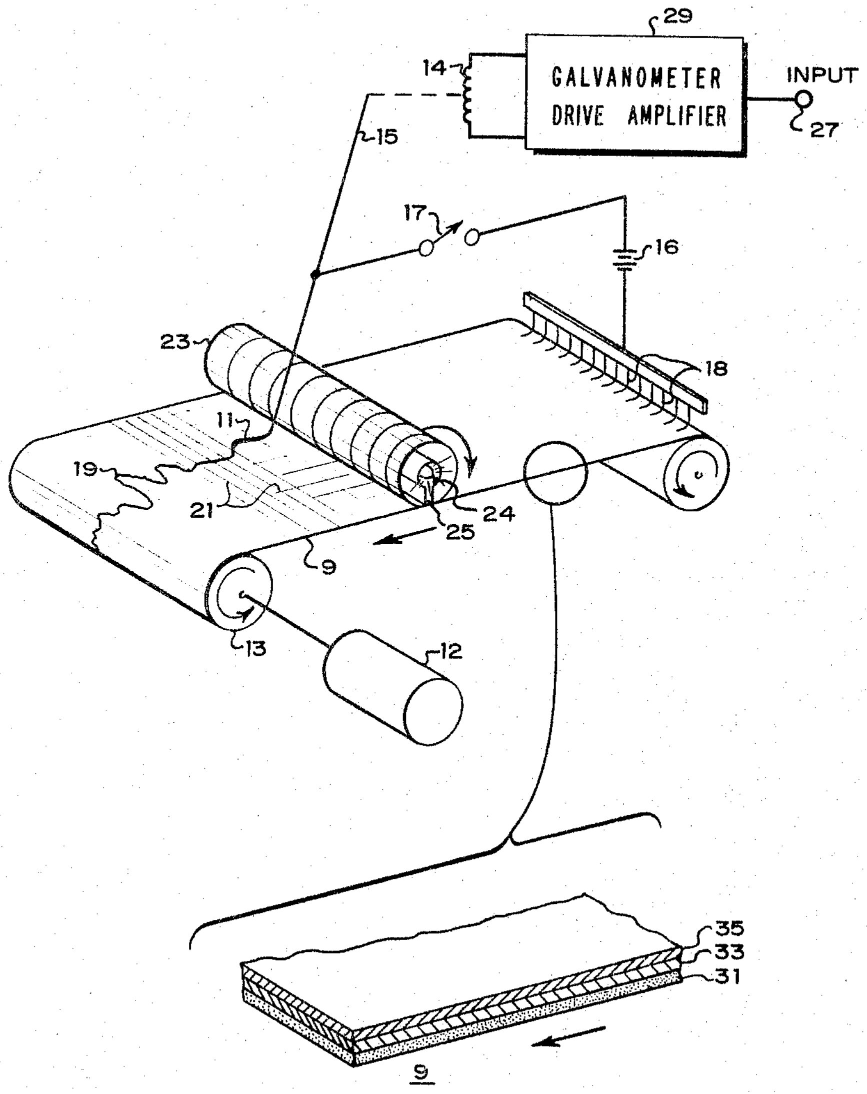
INVENTOR
CHARLES S. REIS
BY Q. C. Smith
ATTORNEY

United States Patent Office 3,319,251
Patented May 9, 1967

3,319,251

PHOTO- AND ELECTRO-SENSITIVE RECORDING APPARATUS AND METHOD

Charles S. Reis, Mountain View, Calif., assignor to Hewlett-Packard Company, Palo Alto, Calif., a corporation of California Filed Nov. 6, 1964, Ser. No. 409,487
4 Claims. (Cl. 346—1)

ABSTRACT OF THE DISCLOSURE

Improved recording medium and recording apparatus exposes the recording medium to light through a photographic master for producing desired background scales on the recording medium and applies electrical writing signal to the photographically-printed recording medium for producing contrasting marks thereon.

It is an object of the present invention to provide an improved electrosensitive and photosensitive recording medium which produces a record in response to applied electrical writing signals and which provides a photographic print of graphic lines for use in a graphic recorder.

It is another object of the present invention to provide a recording medium and recording apparatus therefor which provides a photographic record as well as an electrographic record on the same recording medium.

It is another object of the present invention to provide an improved method of photographic and electrographic recording.

In accordance with the illustrated embodiment of the present invention, a photo- and electro-sensitive recording medium is produced by forming a conductive base layer on suitable backing material and by applying a coating on the base layer which prints out photographically when exposed to light and which also changes color in regions thereof that receive electrical writing signals. Apparatus for recording on this medium includes photographic printing means for producing a graphic scale on the medium during the electrical record-printing operation.

These and other objects of the invention will be apparent from a reading of this specification and an inspection of the accompanying drawing which shows a pictorial diagram of the photo- and electro-sensitive medium and recording apparatus according to the present invention.

In the drawing, the recording medium 9 is moved in one direction by drive motor 12 and roller 13 and the writing electrode 11 is moved across the width of medium 9 by the galvanometer 14 and associated linkage 15. Electrical writing signal from source 16 is applied through switch 17 to the electrode 11 which is disposed in contact with the surface of recording medium 9. The wiper fingers 18 provide wide area contact with the medium 9 for the return path of the writing signal. Contrasting line 19 is produced on the medium 9 in response to the writing signals as the electrode passes along the surface.

Graphic chart lines 21 are photographically produced on the recording medium 9 as it advances by the chart-line light mask 23, the periphery of which moves along at the same surface velocity as medium 9 and by the light system including light source 24 and projection slit 25 disposed behind the light mask 23.

In operation, an input signal applied to the input terminal 27 is amplified by the galvanometer drive amplifier 29 and is applied to the galvanometer 14 which, in turn, positions the electrode 11 across the width of medium 9 in relation to the amplitude of the applied signal. As the medium 9 is advanced by motor 12, the writing signal which flows from source 16 through electrode 11 causes local heating in the electrode contact regions to a temperature which is sufficiently high to cause the heat-sensitive material of coating 35 to change color, thereby producing the contrasting line 19. At the same time, graphic chart lines 21 (or any other desired background matter) is photograhpically printed out from the lightmask 23 onto the photosensitive medium 9 by the light source 24 and projection slit 25. The lightmask 23 can thus be changed during recording of a signal when a change of scale factor is desired. This obviates the need for changing the entire supply of recording medium 9 as, for example, when it is preprinted with a selected scale. The recording medium 9 having a plain surface can thus be used in several instruments of different type as, for example, in electro-sensitive digital printers, electro-sensitive graphic recorders, electro-photographic instruments, and the like.

The photo- and electro-sensitive recording medium 9 is prepared according to one embodiment of the present invention as follows: aluminum is vapor-deposited or laminated onto suitable backing material 31 such as paper or plastic film using well-known methods to form a thin conductive base layer 33. The surface coating 35 on the base layer 33 includes a heat-sensitive material which changes color at elevated temperatures and a light-sensitive material which provides a photographic print of a lighted image. This coating may be prepared according to one embodiment of the present invention by combining 100 grams of indium-doped zinc oxide which acts as a white pigment as well as an electrical conductor 62.5 grams of a suitable binder such as Lucite No. 2040, 137 milliliters of a solvent such as xylene or toluene, 25 grams of heat-sensitive substance formulated using four parts by weight of a heavy metal salt such as nickel acetate or nickel stearate to one part by weight of an alkaline earth metal sulfide such as calcium sulfide, barium sulfide or the like and a light-sensitive material formulated using 1 cc. of eicosane, 19 cc. of polystyrene, 2.5 grams of diphenylamine, 2.8 grams of carbotetrabromide and .6 gram of hexachloroethane.

Other heat-sensitive substances may be formulated using 7.5 parts by weight of nickel palmitate, 2.5 parts by weight of barium or calcium sulfate and 1 part by weight of stearic or palmitic acid. Still another heat-sensitive substance may be formulated using 5 parts by weight of a stearate of a metal such as cobalt, copper, lead, magnesium, manganese, mercury, nickel or zinc and 1 part by weight of diphenylcarbozone. Of course, it will be appreciated by those skilled in the art that any heat-sensitive material including azo, diazo and leuco dyes (the latter dye being less light-sensitive than the azo and diazo dyes) may be used in the surface coating material.

Other light-sensitive materials may be formulated using two parts eicosane, one part N-vinylcarbazole and one part carbon tetrabromide.

This coating material is rolled or sprayed onto the base layer 33 to a wet thickness of about 3 mils and is dried at a temperature below the threshold value at which the color transition in the heat-sensitive material takes place. The surface layer 35 thus formed comprises a matrix of heat-sensitive, light-sensitive and electrically conductive materials which are bonded to the base layer 33. A writing signal applied to medium 9 through electrode 11 passes through this matrix with sufficiently high current density to cause local heating of the conductive particles which, in turn, causes the heat-sensitive materials to undergo a change of color in the regions beneath the contact area of the electrode 11. This same writing signal flowing through wipers 18 in the return path does not produce contrasting marks at the wipers 18 because their wide contact area maintains the current density sufficiently low beneath this contact area to prevent any appreciable local heating, i.e. the joule heating (watts/cm.$^3$) is not sufficient to cause a color change.

The writing signal amplitude required to produce a contrasting record may be reduced further according to one embodiment of the present invention by providing a biasing signal for the heat-sensitive surface layer. As is commonly known, leuco dyes and other mentioned heat-sensitive compounds used in the surface layer 35 change composition, and hence, change color rather abruptly within a 5° C. temperature range. Thus the surface layer 35 may be elevated in temperature by heat from the light source 24 (or from any other suitable heat source disposed near the electrode 11) to a temperature just below the threshold value at which the color transition in the dye occurs. This transition may occur typically within a 5° C. range so that the internal or joule heating provided by the writing signal need only produce a small increment in temperature. Considerably less power per electrode is then required from the writing signal to elevate the contact regions of surface layer 35 above the transition temperature to produce a contrasting record. Thus photo-sensitive and electro-sensitive records may be produced on the same recording medium using the recording medium and apparatus of the present invention.

I claim:

1. A recording method comprising:

exposing to a light image an electrically conductive matrix including a light-sensitive material which changes color in response to light and a heat-sensitive material which changes color at elevated temperatures to produce an image of contrasting color in the matrix; and passing an electrical signal through said conductive matrix to electrically heat selected regions thereof to a temperature above said elevated temperature to produce a color change in said heat-sensitive material for providing a contrasting record in such selected regions.

2. Recording apparatus comprising:

a base layer of conductive material;

a conductive surface coating disposed on said base layer including a heat-sensitive material which changes color at elevated temperatures and a light-sensitive material which changes color in response to light applied thereto;

means producing a light image disposed near said surface coating for exposing said surface coating to light for producing an image record thereon of contrasting color;

a source of writing signal; and an electrode connected to said source and disposed to apply a writing signal to said surface coating with sufficient amplitude to produce a current flow therethrough with sufficient current density to increase the temperature of local regions of the surface coating near the electrode to a temperature above the elevated temperature at which said heat-sensitive material changes color, thereby to produce a contrasting record in such regions.

3. Apparatus as in claim 2 wherein said means for producing a light image includes a light source and a light mask which carries a selected image interposed between said surface coating and said light source.

4. Apparatus as in claim 3 wherein the base layer and conductive surface coating thereon and said light mask move in a selected direction at equal surface velocities.

References Cited by the Examiner

UNITED STATES PATENTS

| | | | |
|---|---|---|---|
| 2,663,654 | 12/1953 | Miller et al. | 346—76 XR |
| 2,707,524 | 5/1955 | Montgomery | 346—107 |
| 3,064,260 | 11/1962 | Heiland | 346—76 XR |
| 3,122,448 | 2/1964 | Hills et al. | 346—135 XR |
| 3,233,244 | 2/1966 | Winterhalter | 346—76 |

RICHARD B. WILKINSON, *Primary Examiner.*

J. W. HARTARY, J. G. MURRAY, *Assistant Examiners.*